United States Patent [19]

Waters, Jr.

[11] 4,311,320
[45] Jan. 19, 1982

[54] RUNNING BOARD ASSEMBLY HAVING A UNIVERSAL MOUNTING BRACKET

[76] Inventor: John E. Waters, Jr., P.O. Box 8867, Waco, Tex. 76710

[21] Appl. No.: 26,283

[22] Filed: Apr. 2, 1979

[51] Int. Cl.³ .............................................. B60R 3/00
[52] U.S. Cl. .................................... 280/163; 108/44; 248/201; 280/169; 296/62
[58] Field of Search ............... 280/163, 164 R, 164 A, 280/169; 248/201, 202.1; 296/62; 108/44, 45

[56] References Cited

U.S. PATENT DOCUMENTS

| | | | |
|---|---|---|---|
| 2,084,019 | 6/1937 | Edwards | 280/163 |
| 2,189,155 | 2/1940 | Upson | 280/164 R |
| 4,021,055 | 5/1977 | Okland | 280/163 X |
| 4,132,397 | 1/1979 | Ward | 248/201 X |
| 4,257,620 | 3/1981 | Okland | 280/153 R |

FOREIGN PATENT DOCUMENTS

| | | | |
|---|---|---|---|
| 1408677 | 7/1965 | France | 248/201 |
| 918228 | 2/1963 | United Kingdom | 280/163 |

*Primary Examiner*—Joseph F. Peters, Jr.
*Assistant Examiner*—D. W. Underwood
*Attorney, Agent, or Firm*—John F. Booth; Gerald G. Crutsinger; Monty L. Ross

[57] ABSTRACT

A running board assembly (10) for a vehicle (12) includes a running board plate (14) which has an upturned lip (18) on one edge thereof and a downturned lip (16) on the opposite edge. A splash guard (20) is mounted on the forward end of plate (14) and extends into the wheel well of the vehicle (12). A pair of universal mounting brackets (34, 44) are interchangeable between sides of the vehicle (12) to adapt a single size running board to fit the vehicle (12) which has either of two spacing distances between mounting points thereof. The running board plate (14) has longitudinal ridges (52) and elastomeric strips (62, 64) which provide both transverse and longitudinal traction.

19 Claims, 4 Drawing Figures

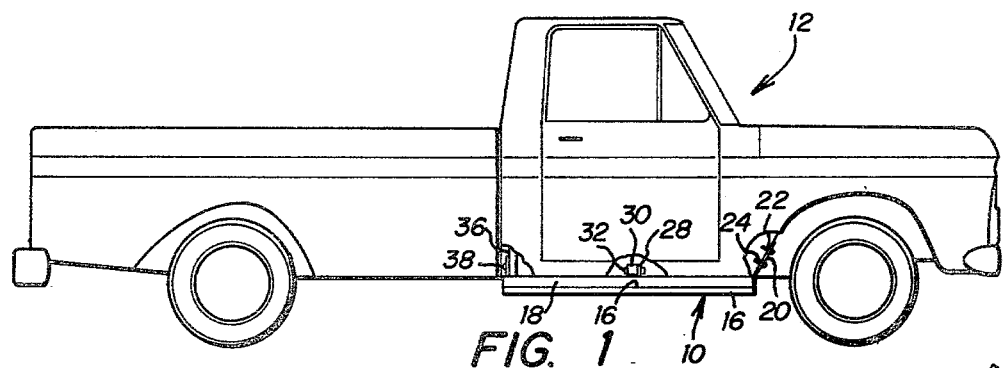
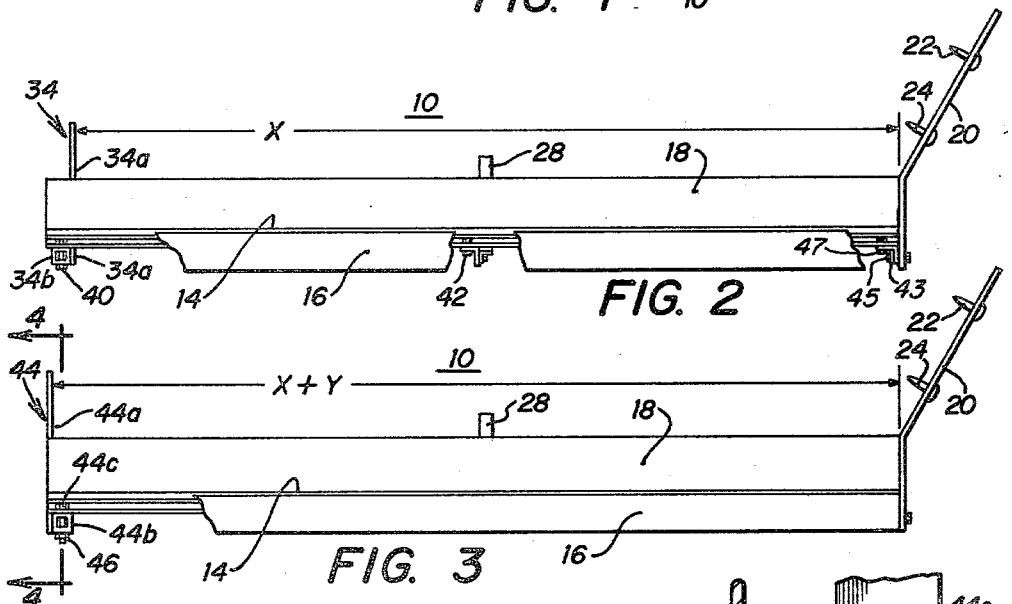
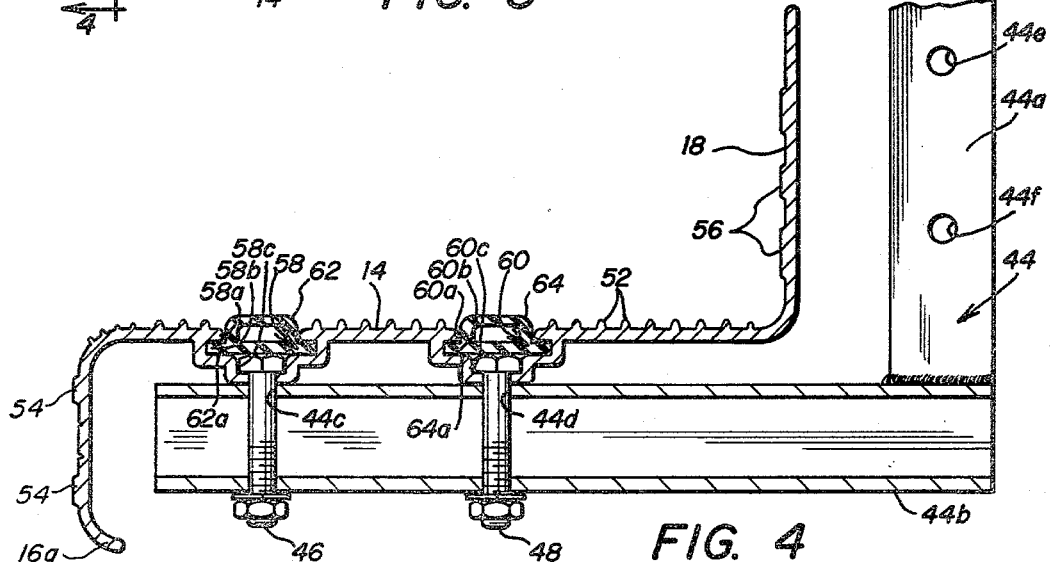

RUNNING BOARD ASSEMBLY HAVING A UNIVERSAL MOUNTING BRACKET

FIELD OF THE INVENTION

The present invention pertains to automotive accessories, and more particularly to a running board assembly which is installed on the side of a vehicle below the door to provide a step platform.

BACKGROUND OF THE INVENTION

Early model automobiles, including pickup truck style vehicles, were manufactured to include a running board as a part of the vehicle's body work. However, for the last several years running boards have no longer been included as a part of the originally manufactured body-work for a vehicle. In many cases, the owners of vehicles, particularly pickup trucks, desire to have running boards installed on the vehicles and, therefore, must buy them as separate automobile accessories.

Heretofore, running board assemblies have been available as add-on items, but the manufacturing and stocking of the running boards is difficult due to the variations in mounting points on the vehicle frames. Numerous styles and sizes are required to satisfy the requirements of owners of various models and makes of trucks.

Therefore, there exists a need for a running board assembly which has a universal mounting bracket so that a single size of running board assembly can be utilized on a wide range of truck models. It is an object of this invention to provide such a running board assembly.

DISCLOSURE OF THE INVENTION

A running board assembly is provided for mounting on the lower side of a vehicle to serve as a step platform. The running board assembly comprises an elongate metal plate having an upturned lip along one edge and a downturned lip along the opposite edge. The upturned lip is mounted adjacent the vehicle. The metal plate has integrally formed therein a plurality of longitudinal ridges and at least one longitudinal groove having engaged therein an elongate elastomeric member which projects above the surface of the metal plate.

In a further aspect of the present invention, there is provided a pair of universal brackets for mounting one of the running boards on each side of a vehicle, which has either of two spacing distances between mounting points thereon where the spacing distances differ in length by a fixed distance. A first bracket is provided which includes a first supporting beam having at least one mounting hole therein with the width of the first beam essentially equal to the fixed distance. A first elongate plate is joined transversely to the first beam on a first side thereof. The plane of the first plate is essentially parallel to the axis of the mounting hole in the first beam. A second bracket is provided which includes a second supporting beam similar to the first beam and has at least one mounting hole therein. The width of the second beam is essentially equal to the fixed distance. A second elongate plate is joined transversely to the second beam on a second side thereof, wherein the plane of the second plate is essentially parallel to the axis of the mounting hole in the second beam. The second plate is mounted on the opposite side of the second beam from the position of the first plate on the first beam. The first and second brackets are changeable between the sides of the vehicle to adapt to either of the spacing distances between mounting points while maintaining a given spacing between the mounting holes in the beams and a secondary mounting point on each side of the vehicle. Means are provided for securing the brackets to the mounting points on the vehicle and for mounting the running boards on the brackets.

BRIEF DESCRIPTION OF THE DRAWINGS

For a more complete understanding of the present invention and the advantages thereof, reference is now made to the following description taken in conjunction with the accompanying drawings in which:

FIG. 1 is an elevation view of a pickup truck having the running boards of the present invention installed thereon, FIG. 2 is an elevation view of a running board assembly of the present invention as installed on a narrow mounting point spacing, FIG. 3 is an elevation view of the running board assembly of the present invention installed on a wide mounting point spacing, and FIG. 4 is a sectional view of the mounting bracket shown in FIG. 3 taken along lines 4—4.

DETAILED DESCRIPTION OF THE INVENTION

A running board assembly designated generally as 10 is shown in FIG. 1 as it is installed on a pickup truck style vehicle 12. The running board assembly 10 includes a flat plate 14, a downturned lip 16 and an upturned lip 18. A splash guard 20 is mounted on the forward end of plate 14 and is angled into the fender well of truck 12.

Running board assembly 10 has splash guard 20 secured to the fender wall of vehicle 12 by sheet metal screws 22 and 24. A center bracket 28 extends from running board assembly 10 to a frame member 30 of vehicle 12. The center bracket is secured by bolt 32 to frame member 30. A first rear bracket 34 is secured to frame member 36 by bolt 38. Frame member 36 serves as the rear mounting point for the running board assembly 10.

The running board assembly and universal mounting brackets of the present invention are illustrated in FIGS. 2 and 3. The first rear bracket 34 comprises an elongate plate 34a and a horizontal beam 34b. Plate 34a is mounted on the side of beam 34b and extends at a right angle to the beam. Beam 34b has a mounting hole therein which receive a bolt 40 that secures bracket 34 to plate 14.

Center bracket 28 is secured to plate 14 by bolt 42. Bracket 28 is slidable to be positioned for connecting to frame member 30.

Splash guard 20 is connected to plate 14 by an angle brace 43 and a bolt 45. Brace 43 is in turn secured to plate 14 by a bolt 47.

In FIG. 3 there is illustrated a second rear bracket 44 which is installed in place of bracket 36 shown in FIG. 2. Bracket 44 includes an elongate plate 44a which is welded to the side of a beam 44b. A hole 44c is formed through beam 44b and has therein a bolt 46 which secures bracket 44 to plate 14. A hole 44d is also formed in beam 44b and has secured therethrough a bolt 48. Note that plate 44a is secured to the opposite side of beam 44b as compared to the position of plate 34a on beam 34b.

Beams 34b and 44b are illustrated as having a square cross section, however, beams having other shapes such as, for example, angle or rectangular, are functional equivalents.

A cross sectional view of beam 44, together with the remainder of the running board assembly 10, is shown in FIG. 4. Bracket 44 has holes 44e and 44f which pass through plate 44a. These holes are used for securing bracket 44 to mounting point 36.

Plate 14, together with lips 16 and 18, comprises an integral extruded metal unit which includes as a part thereof a plurality of longitudinal ridges 52 on plate 14 as shown in FIG. 4. Lip 16 is provided with ridges 54 which have a greater width than ridges 52. Lip 18 is likewise provided with ridges 56 which are also wider than ridges 52. The ridges 52 serve primarily to provide traction in the transverse direction on the surface of plate 14. However, ridges 52–56 also contribute to the structural strength of the running board assembly 10.

There is also formed in plate 14 in the extrusion process a pair of longitudinal grooves 58 and 60 which extend for the length of plate 14. Grooves 58 and 60 have the same cross sectional shape in which the opening through plate 14 is shown as 58a, the next lower section being wider and designated as 58b and the lowest section being somewhat narrower than 58a and being designated as 58c. Groove 60 is likewise provided with segments 60a, 60b and 60c, similar to those described for groove 58. For each of the grooves 58 and 60, the a and b sections together form an inverted T shape.

Hollow, elastomeric strips 62 and 64 are disposed respectively in grooves 58 and 60. The elastomeric strips are provided with lips 62a and 64a which are dimensioned to be received within sections 58b and 60b of grooves 58 and 60. The upper portions of elastomeric strips 62 and 64 project above the surface of plate 14.

Bolts 46 and 48 are installed respectively in holes 44c and 44d of beam 44b. The heads of these bolts are located within grooves 58 and 62 in sections 58c and 60c, respectively so that the bolts secure the plate 14 to the bracket 44. The groove sections 58c and 60c are sized such that the bolt heads are prevented from turning in the grooves.

A problem frequently encountered in installing running board assemblies to vehicles is that the spacing between the mounting points on the vehicle frame varies from one model to another. For example, in most Ford trucks, the spacing distance is 55 inches, but in most Chevrolet and Dodge trucks, the mounting spacing distance is 56 inches. Heretofore, it has been the practice of manufacturers to produce a running board assembly which is specially adapted to each particular model of vehicle. This practice, however, increases manufacturing expenses and places a burden on the retailers who must stock a number of differing running board models in order to satisfy the requirements of their customers.

The present invention provides a novel solution to the problem of differing mounting bracket spacings where the vehicles to be equipped have either one of two bracket spacing distances. Each set of running boards, in accordance with the present invention, which is provided to a customer has included therewith the brackets 34 and 44. Note that the brackets, as shown in FIGS. 2 and 3, have the vertical elongate plate mounted on opposite sides of the respective supporting beam. These two brackets are interchanged from one side of the vehicle to the other so as to fit either of the two spacings for the most popular types of vehicles. For example, as shown in FIGS. 2 and 3, if the spacing distance between mounting points of a vehicle is the distance shown as X, then bracket 34 will be mounted to support the right side running board while bracket 44 will be mounted on the left side running board. When bracket 44 is reversed from the position shown in FIG. 3, the plate 44a will be on the side of beam 44b toward the front of the vehicle. In this manner, the left side running board also fits the mounting point spacing distance X. But, if the running board assembly is to be installed on a vehicle which has a mounting point spacing distance such as X+Y as shown in FIG. 3, the mounting brackets 34 and 44 are exchanged from one side to the other. In this case, bracket 34 is placed on the left side of the vehicle while bracket 44 is placed on the right side of the vehicle. With this placement, the elongate plates 34a and 44a are positioned on the trailing side of respective beams 34b ad 44b to accomodate the greater mounting point spacing distance X+Y. Thus, by interchanging the brackets of the running board assembly of the present invention from one side to the other, the assembly can be adapted to be installed on vehicles having either of two mounting point spacing distances.

The stepping surface of the running board assembly of the present invention comprises essentially plate 14, which has thereon ridges 52 for providing traction when stepping on the plate. Ridges 52 provide traction especially well along the transverse direction of plate 14. Further traction is provided by the elastomeric strips 62 and 64 which project upward above the surface of plate 14. These strips are made of a material such as either natural or synthetic rubber which depresses under contact to provide substantial longitudinal traction as well as greater transverse traction. The elastomeric strips are made hollow to provide greater resiliency and flexibility.

Lip 16 turns downward from plate 14 at the outboard edge thereof serve as a guard. This lip prevents a shoe or other article of clothing from being snagged on the running board and includes an inward turned portion 16a for even greater protection.

The upturned lip 18 is joined to plate 14 on the inboard side toward the vehicle to also serve as a guard to prevent a person from sliding transversely off of plate 14. This added protective feature is especially important when the vehicle is being used in muddy conditions.

In summary, the present invention provides a running board assembly which has a universal bracket mounting for installing running boards on the most popular vehicles now in use. A running board is provided which offers substantial traction in both the longitudinal and transverse directions by the use of longitudinal ribs and elastomeric strips. Guard members are provided on both edges of the running board to protect the users thereof.

Although one embodiment of the invention has been illustrated in the accompanying drawings and described in the foregoing detailed description, it will be understood that the invention is not limited to the embodiment disclosed, but is capable of numerous rearrangements, modifications and substitutions without departing from the scope of the invention.

I claim:

1. A running board assembly for attaching a step platform on each side of a vehicle below the door thereof, comprising in combination,
   (a) a running board for mounting on each side of said vehicle comprising an elongate metal plate having an upturned lip along one edge and a downturned lip along the opposite edge, said upturned lip adjacent said vehicle, said plate including a plurality of longitudinal ridges and at least one longitudinal groove having engaged therein an elongate elastomeric member which projects above the surface of said metal plate,
   (b) a pair of universal mounting brackets for mounting said running boards one on each side of the vehicle, where the vehicle has either of two spacing distances between mounting points thereon and the spacing distances differ in length by a fixed distance, the universal brackets comprising:
      (i) a first bracket which includes a first supporting beam having at least one mounting hole therein, the width of said first beam essentially equal to said fixed distance, and a first elongate plate joined transversely to said first beam on first side thereof wherein the plane of said first plate is essentially parallel to the axis of the mounting hole in said first beam,
      (ii) a second bracket which includes a second supporting beam similar to said first beam and having at least one mounting hole therein, the width of said second beam essentially equal to said fixed distance, and a second elongate plate joined transversely to said second beam on a second side thereof, wherein the plane of said second plate is essentially parallel to the axis of the mounting hole in said second beam, said second plate mounted on the opposite side of said second beam from the position of said first plate on said first beam,
      (iii) said first and said second brackets changeable between the sides of said vehicle to adapt to either of said two spacing distances between mounting points,
   (c) means securing said brackets to the mounting points on said vehicle, and
   (d) means securing said running boards to said brackets.

2. A running board assembly as recited in claim 1 wherein said mounting holes pass through the longitudinal centerline of said beams.

3. A running board assembly as recited in claim 1 wherein said beams have a square cross section.

4. A running board assembly as recited in claim 1 wherein said elongate plates are mounted adjacent an end of said beams.

5. A running board assembly as recited in claim 1 wherein each of said elongate plates has at least one hole therein for receiving a bolt to connect said elongate plates to said mounting points on said vehicle.

6. A running board assembly as recited in claim 1 further including a splash guard comprising a second metal plate which is joined to the leading end of said first metal plate and extends upward and forward from said first metal plate to prevent road material from being thrown onto the upper surface of the running board.

7. A running board assembly as recited in claim 1 further including a plurality of mounting holes passing through said metal plate within said groove, said elastomeric member covering said mounting holes.

8. A running board assembly as recited in claim 1 wherein said groove has a cross section in the form of an inverted T shape wherein the lower section of said groove is wider than the upper section thereof.

9. A running board as recited in claim 8 wherein said elastomeric member has an inverted T shape dimensioned to engage said inverted T-shaped groove.

10. A pair of universal brackets upon which are mounted running boards, one on each side of a vehicle, wherein the vehicle has either of two spacing distances between the mounting points thereof and the spacing distances differ in length by a fixed distance, the brackets comprising in combination:
    (a) a first bracket which includes a first supporting beam having at least one mounting hole therein, said first beam having a width which is essentially equal to said fixed distance, and a first elongate plate joined transversely to said first beam on a first side thereof wherein the plane of said first plate is essentially parallel to the axis of the mounting hole in said first beam,
    (b) a second bracket which includes a second supporting beam similar to said first beam and having at least one mounting hole therein, said second beam having a width which is essentially equal to said fixed distance, and a second elongate plate joined transversely to said second beam on a second side thereof, wherein the plane of said second plate is essentially parallel to the axis of the mounting hole in said second beam, said second plate mounted on the opposite side of said second beam from the position of said first plate on said first beam,
    (c) said first and said second brackets changeable between the sides of said vehicle to adapt to either of said two spacing distances between mounting points,
    (d) means for securing said brackets to the mounting points on said vehicle, and
    (e) means for securing the running boards against an upper portion of the beams of said brackets.

11. A pair of universal brackets as recited in claim 10 wherein said mounting holes pass through the longitudinal centerline of said beams.

12. A pair of universal brackets as recited in claim 10 wherein said beams have a square cross section.

13. A pair of universal brackets as recited in claim 10 wherein said elongate plates are mounted adjacent an end of said beams.

14. A pair of universal brackets as recited in claim 10 wherein each of said elongate plates has at least one hole therein for receiveing a bolt to connect said elongate plates to said mounting points on said vehicle.

15. A running board for mounting on the lower side of a vehicle to serve as a step platform comprising an elongate metal plate having an upturned lip along one edge and a downturned lip along the opposite edge, said upturned lip adjacent said vehicle, said plate including a plurality of longitudinal ridges and at least one longitudinal groove, a plurality of mounting holes passing through said metal plate within said groove and an elongate elastomeric member for each groove to cover said mounting holes, each elastomeric member having a portion engaged in the groove and being dimensioned so that said elastomeric member extends above the surface of said metal plate between longitudinal ridges.

16. A running board as recited in claim 15 further including a splash guard comprising a second metal plate which is joined to the leading end of said first metal plate and extends upward and forward from said first metal plate to prevent road material from being thrown onto the upper surface of the running board.

17. A running board as recited in claim 15 wherein said groove has a cross section in the form of an inverted T shape wherein the lower section of said groove is wider than the upper section thereof.

18. A running board as recited in claim 17 wherein said elastomeric member has an inverted T shape dimensioned to engage said inverted T-shaped groove.

19. A running board for mounting on the lower side of a vehicle below a door to serve as a step platform, comprising in combination:
(a) an extruded elongate metal plate having an upturned lip along one edge and a downturned lip along the opposite edge, said upturned lip positioned adjacent said vehicle,
(b) a plurality of ridges extending longitudinally along said plate and integral therewith,
(c) at least two longitudinal grooves formed within said plate and extending the length thereof, each said groove extending downward and outward from the surface of said metal plate to form an inverted T cross section;
(d) a hollow, elongate elastomeric member disposed within each said groove, said elastomeric member having an inverted T cross section and dimensioned so that said elastomeric members can be engaged within said grooves and project above the surface of said metal plate,
(e) said metal plate between ridges having a plurality of mounting holes passing therethrough, said mounting holes positioned within said grooves such that said mounting holes are covered by said elastomeric members, and
(f) a splash plate connected to the leading edge of said metal plate, said splash plate extending upward and forward from said metal plate to prevent road material from being thrown onto the upper surface of the running board.

* * * * *

UNITED STATES PATENT AND TRADEMARK OFFICE
CERTIFICATE OF CORRECTION

PATENT NO. : 4,311,320
DATED : January 19, 1982
INVENTOR(S) : John E. Waters, Jr.

It is certified that error appears in the above-identified patent and that said Letters Patent are hereby corrected as shown below:

Column 8, line 11, before "," insert -- between ridges --;

line 12, delete -- between ridges --.

Signed and Sealed this

Twentieth Day of July 1982

[SEAL]

Attest:

GERALD J. MOSSINGHOFF

Attesting Officer — Commissioner of Patents and Trademarks